United States Patent
Yoshida et al.

(10) Patent No.: US 11,959,449 B2
(45) Date of Patent: Apr. 16, 2024

(54) CONTROL DEVICE FOR HYBRID ELECTRIC VEHICLE

(71) Applicant: TOYOTA JIDOSHA KABUSHIKI KAISHA, Aichi-ken (JP)

(72) Inventors: Takahiro Yoshida, Nagoya (JP); Masanao Idogawa, Nagoya (JP); Masahiro Kachi, Nagakute (JP); Koji Ichikawa, Aichi-ken (JP); Satoshi Masuda, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 18/069,900

(22) Filed: Dec. 21, 2022

(65) Prior Publication Data

US 2023/0296071 A1    Sep. 21, 2023

(30) Foreign Application Priority Data

Mar. 17, 2022  (JP) .................................. 2022-042555

(51) Int. Cl.
| | |
|---|---|
| *F02N 11/08* | (2006.01) |
| *F02D 41/06* | (2006.01) |
| *F02D 41/30* | (2006.01) |

(52) U.S. Cl.
CPC ........ *F02N 11/0859* (2013.01); *F02D 41/062* (2013.01); *F02D 41/3017* (2013.01); *F02N 11/0851* (2013.01); *F02N 2200/022* (2013.01); *F02N 2200/041* (2013.01)

(58) Field of Classification Search
CPC ............ F02N 11/0859; F02N 11/0851; F02N 2200/022; F02N 2200/041; F02D 41/062; F02D 41/3017; F02D 41/061; F02D 41/3094; B60K 2006/268
See application file for complete search history.

(56) References Cited

U.S. PATENT DOCUMENTS

| | | | |
|---|---|---|---|
| 10,954,880 B1 * | 3/2021 | Thomas | F02M 69/465 |
| 11,346,297 B1 * | 5/2022 | Pursifull | F02D 41/3809 |
| 2018/0066598 A1 * | 3/2018 | Dusa | F02D 41/3094 |
| 2018/0334984 A1 * | 11/2018 | Thomas | F02D 41/402 |
| 2019/0126909 A1 * | 5/2019 | Kim | F02D 41/0097 |
| 2021/0129830 A1 * | 5/2021 | Matsubara | B60W 10/06 |

FOREIGN PATENT DOCUMENTS

| | | |
|---|---|---|
| JP | 2014172540 A | 9/2014 |
| JP | 202154165 A | 4/2021 |

* cited by examiner

*Primary Examiner* — Sizo B Vilakazi
(74) *Attorney, Agent, or Firm* — HAUPTMAN HAM, LLP (57) ABSTRACT

A control device for a hybrid electric vehicle includes an electronic control unit. The electronic control unit is configured to perform a start-up control of shifting the connection and disconnection clutch to a coupled state at the time of starting the internal combustion engine to rotate the internal combustion engine by the driving torque of the electric motor, and starting the first fuel injection mode using the direct injection injector. The electronic control unit is configured to switch from the first fuel injection mode to a second fuel injection mode for using the port injector prior to an end of the start-up control when the number of times of combustion cycles of the internal combustion engine with the first fuel injection mode reaches a predetermined first target number of times.

5 Claims, 6 Drawing Sheets

CONTROL DEVICE FOR HYBRID ELECTRIC VEHICLE

CROSS-REFERENCE TO RELATED APPLICATION

This application claims priority to Japanese Patent Application No. 2022-042555 filed on Mar. 17, 2022, incorporated herein by reference in its entirety.

BACKGROUND

1. Technical Field

The present disclosure relates to a control device for a hybrid electric vehicle.

2. Description of Related Art

Conventionally, there has been known a hybrid electric vehicle including an internal combustion engine, an electric motor capable of outputting torque to a drive system, and a connection and disconnection clutch (hydraulic clutch) that connects the internal combustion engine and the electric motor and disconnects connection between the internal combustion engine and the electric motor (see, for example, Japanese Unexamined Patent Application Publication No. 2021-054165 (JP 2021-054165 A)). JP 2021-054165 A discloses engine start control in which slip control of the connection and disconnection clutch is executed when a start condition of the internal combustion engine is satisfied, and the internal combustion engine is started by cranking torque generated by the electric motor. Such engine start control is executed in a period until a speed of the internal combustion engine and a rotational speed of the electric motor coincide with each other and the connection and disconnection clutch is brought into an engaged state.

SUMMARY

An internal combustion engine mounted on a hybrid electric vehicle may include a direct injection injector and a port injector. Since the direct injection injector injects fuel directly into a cylinder, it is necessary to improve the atomization property of the fuel as compared with the port injector that takes the fuel atomized at an intake port into the cylinder. Therefore, in the direct injection injector, the fuel pressure at the time of fuel injection is high, and the combustion stability is high. Therefore, the direct injection injector can easily obtain torque as compared with the port injector, and can efficiently increase the engine speed. For this reason, in the internal combustion engine including the direct injection injector and the port injector, at the time of starting the internal combustion engine, first, the direct injection injector is used to perform the fuel injection at the time of starting the internal combustion engine. Then, an injection mode transitions to the fuel injection using the port injector. Here, the fuel injection using the port injector is an injection mode in which a fuel injection amount corresponding to a required injection amount of the internal combustion engine is injected using the port injector. Such a fuel injection mode is also applied to a case where the internal combustion engine is started by the electric motor, such as the hybrid electric vehicle disclosed in JP 2021-054165 A, and when the internal combustion engine is started by the electric motor, the fuel injection using the direct injection injector is first performed.

As described above, the direct injection injector is suitable for the injection mode of the fuel at the time of starting the internal combustion engine, but may cause adhesion of the fuel to the inner peripheral wall of a cylinder bore. In particular, in a conventional hybrid electric vehicle in which the internal combustion engine is started by the electric motor, the engine start control is continued until the speed of the internal combustion engine and the rotational speed of the electric motor coincide with each other, and the connection and disconnection clutch is brought into an engaged state. Further, since the fuel injection using the direct injection injector is performed while the engine start control is being performed, a period in which the direct injection injector is used is likely to be prolonged, and accordingly, the amount of adhesion of the fuel to the inner peripheral wall of the cylinder bore may increase.

Therefore, an object of the control device of the hybrid electric vehicle disclosed in the present specification is to suppress the adhesion of the fuel to the inner peripheral wall of the cylinder bore in the internal combustion engine when the internal combustion engine in the hybrid electric vehicle is started.

In a control device for a hybrid electric vehicle according to a first aspect of the present disclosure, the hybrid electric vehicle includes an internal combustion engine including a direct injection injector and a port injector, an electric motor connected to a power transmission path between the internal combustion engine and a drive wheel such that the electric motor is able to transmit power, and a connection and disconnection clutch that is provided in the power transmission path and that disconnects connection between the internal combustion engine and the electric motor when being switched to a released state. The control device for the hybrid electric vehicle includes an electronic control unit. The electronic control unit is configured to rotate the internal combustion engine with driving torque of the electric motor by shifting the connection and disconnection clutch to an engaged state when the internal combustion engine is started, and to execute start-up control for starting a first fuel injection mode for using the direct injection injector. Further, the electronic control unit is configured to switch from the first fuel injection mode to a second fuel injection mode for using the port injector prior to an end of the start-up control when the number of times of combustion cycles of the internal combustion engine with the first fuel injection mode reaches a predetermined first target number of times.

In the control device for the hybrid electric vehicle according to the first aspect, the electronic control unit may be configured to terminate the start-up control when the number of times of the combustion cycles of the internal combustion engine reaches a predetermined second target number of times. Here, the second target number of times may be larger than the first target number of times.

In the control device for the hybrid electric vehicle according to the first aspect, the electronic control unit may be configured to terminate the start-up control when determination is made that a speed of the internal combustion engine and a rotational speed of the electric motor are synchronized with each other.

In the control device for the hybrid electric vehicle according to the first aspect, the number of times of the combustion cycles of the internal combustion engine may be the number of times of injection of the direct injection injector.

In the control device for the hybrid electric vehicle according to the first aspect, the number of times of the combustion cycles of the internal combustion engine may be the number of times of ignition by a spark plug provided in the internal combustion engine.

According to the present disclosure, it is possible to suppress the adhesion of the fuel to the inner peripheral wall of the cylinder bore in the internal combustion engine when the internal combustion engine in the hybrid electric vehicle is started.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Embodiment

Hereinafter, embodiments of the present disclosure will be described with reference to the accompanying drawings. However, in the drawings, the dimensions, ratios, and the like of the respective parts may not be shown so as to completely coincide with the actual ones. Further, in some drawings, details are omitted. Further, the scale of each element depicted between the figures may be different.

Outline of the Hybrid Electric Vehicle

Figure 1:
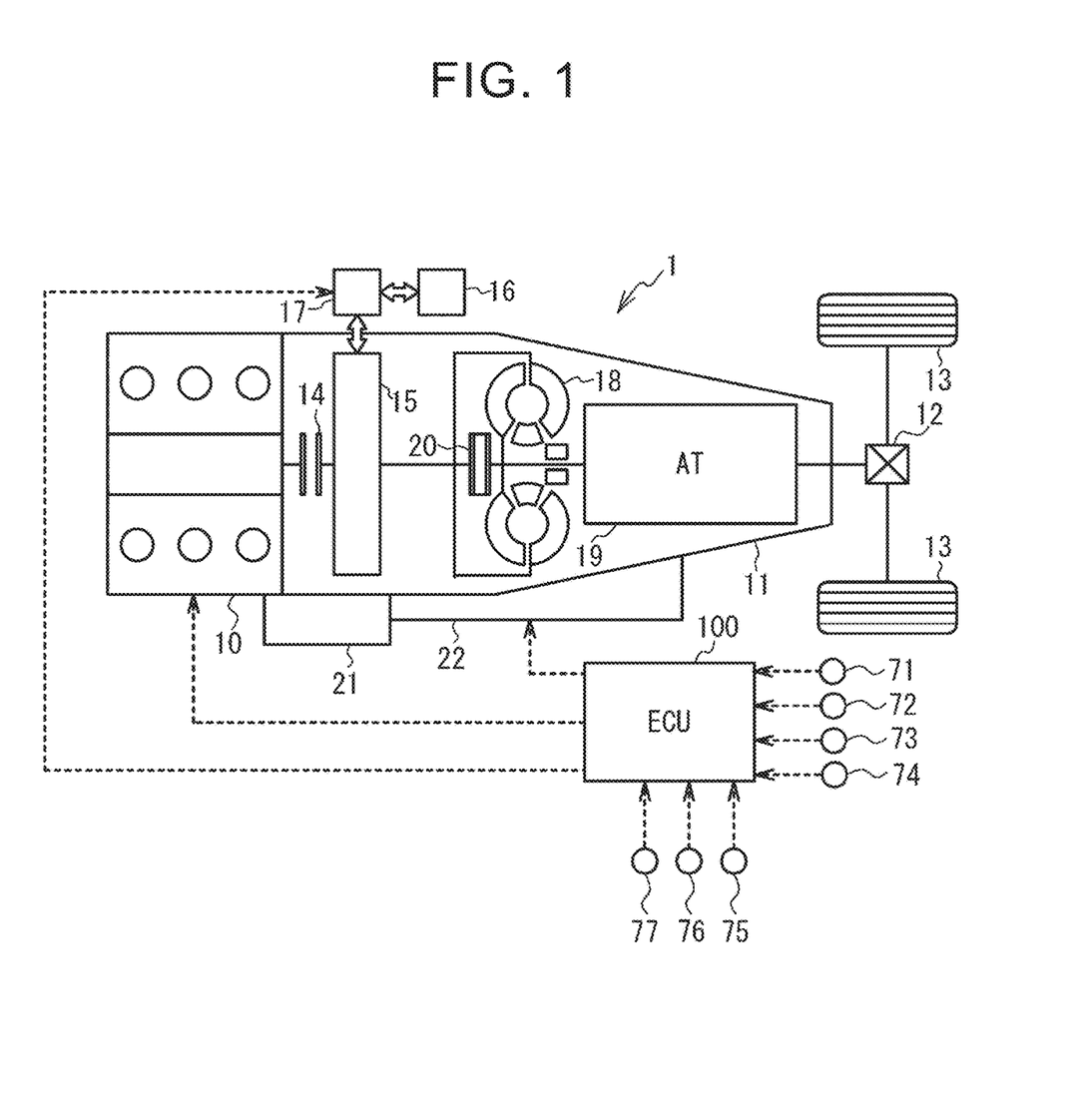
FIG. 1 is a schematic configuration diagram of a hybrid electric vehicle including an electronic control unit (ECU) according to an embodiment.

FIG. 1 is a schematic configuration diagram of a hybrid electric vehicle 1. In the hybrid electric vehicle 1, a K0 clutch 14, a motor generator (MG)15, torque converter 18, and transmission 19 are provided in this order in the power transmission path from the engine 10 corresponding to the internal combustion engine to the drive wheels 13. The engine 10 and the motor generator 15 are mounted as driving sources for driving the hybrid electric vehicle 1. The engine 10 is an example of an internal combustion engine, and is, for example, a V-type 6-cylinder gasoline engine. The number of cylinders of the engine 10 is not limited to this, and the engine 10 may be a series type gasoline engine. K0 clutch 14, the motor generator 15, the torque converter 18, and the transmission 19 are provided in the transmission unit 11. The transmission unit 11 and the left and right drive wheels 13 are drivingly connected to each other via a differential 12.

K0 clutch 14 is provided between the motor generator 15 and the engine 10 on the power transmission path. K0 clutch 14 is supplied with hydraulic pressure from the released state to be brought into an engaged state, and connects the power transmission between the engine 10 and the motor generator 15. K0 clutch 14 is released in response to the stoppage of the hydraulic pressure supply, and shuts off the power transmission between the engine 10 and the motor generator 15. The engagement state is a state in which both engagement elements of K0 clutch 14 are coupled to each other, and the engine 10 and the motor generator 15 have the same rotational speed. The disengaged state is a state in which both engagement elements of K0 clutches 14 are separated from each other. K0 clutch 14 corresponds to a connection and disconnection clutch. When the engine 10 is started by the driving force of the motor generator 15, the crankshaft of the engine 10 rotates due to the gradual transition of K0 clutch 14 to the coupled condition. In this way, the engine 10 can be started by injecting fuel while the crankshaft is rotating by the motor generator 15. The starting of the engine will be described in detail later.

The motor generator 15 is connected to the battery 16 via an inverter 17. The motor generator 15 functions as a motor that generates a driving force of the vehicle in response to power supply from the battery 16, and also functions as a generator that generates electric power to be charged to the battery 16 in response to power transmission from the engine 10 and the drive wheels 13. The electric power exchanged between the motor generator 15 and the battery 16 is adjusted by the inverter 17. The motor generator 15 corresponds to an electric motor.

The inverter 17 is controlled by an ECU 100 to be described later, and converts a DC voltage from the battery 16 into an AC voltage, or converts an AC voltage from the motor generator 15 into a DC voltage. In the case of the power running operation in which the motor generator 15 outputs torque, the inverter 17 converts the DC voltage of the battery 16 into an AC voltage and adjusts the power supplied to the motor generator 15. In the case of the regenerative operation generated by the motor generator 15, the inverter 17 converts the AC voltage from the motor generator 15 into a DC voltage and adjusts the electric power supplied to the battery 16.

The torque converter 18 is a fluid coupling having a torque amplification function. The transmission 19 is a stepped automatic transmission in which the gear ratio is switched in multiple stages by switching the gear stages, but the present disclosure is not limited thereto, and may be a continuously-type automatic transmission. The transmission 19 is provided between the motor generator 15 and the drive wheels 13 on the power transmission path. The motor generator 15 and the transmission 19 are coupled to each other via the torque converter 18. The torque converter 18 is provided with a lock-up clutch 20 that receives a supply of hydraulic pressure and is in an engaged state to directly connect the motor generator 15 and the transmission 19.

The transmission unit 11 is further provided with an oil pump 21 and a hydraulic control mechanism 22. Hydraulic pressure generated by the oil pump 21 is supplied to K0 clutch 14, the torque converter 18, the transmission 19, and the lockup clutch 20 via the hydraulic control mechanism 22. The hydraulic control mechanism 22 is provided with hydraulic circuits of K0 clutch 14, the torque converter 18, the transmission 19, and the lockup clutch 20, and various hydraulic control valves for controlling the hydraulic pressures. A wet clutch may be provided instead of the torque converter 18.

The hybrid electric vehicle 1 is provided with an Electronic Control Unit (ECU) 100 as a control device of the vehicle. ECU 100 is an electronic control unit including an arithmetic processing unit that performs various arithmetic processing related to travel control of vehicles, and a memory that stores control programs and data. ECU 100 performs start-up control when the engine 10 is started.

ECU 100 controls driving of the engine 10 and the motor generator 15. Specifically, ECU 100 controls the torque and the rotational speed of the engine 10 by controlling the throttle opening degree, the ignition timing, and the fuel injection quantity of the engine 10. ECU 100 controls the torque and the rotational speed of the motor generator 15 by controlling the inverters 17 to adjust the amount of transfer of electric power between the motor generator 15 and the battery 16. ECU 100 controls driving of K0 clutch 14, the lock-up clutch 20, and the transmission 19 through control of the hydraulic control mechanism 22.

Signals from the ignition switch 71, the crank angle sensor 72, the motor rotational speed sensor 73, the accelerator operation amount sensor 74, the air flow meter 75, the air-fuel ratio sensor 76, and the water temperature sensor 77 are inputted to ECU 100. The crank angle sensor 72 detects the rotational speed of the crankshaft of the engine 10. The motor rotational speed sensor 73 detects the rotation speed of the output shaft of the motor generator 15. The accelerator operation amount sensor 74 detects an accelerator pedal opening degree that is a depression amount of the accelerator pedal of the driver. The air flow meter 75 detects an intake air amount of the engine 10. The air-fuel ratio sensor 76 detects the air-fuel ratio of the exhaust gas flowing into the catalyst 43. The water temperature sensor 77 detects the temperature of the coolant of the engine 10.

ECU 100 selects which of the direct injection injector 41d and the port injector 41p included in the engine 10 is to be used. Selection of the injector also includes selection of which injector to use in the start-up control. In addition, ECU 100 counts the number of injections by the injectors and the number of ignitions by the spark plugs 42 (see FIG. 2) described later. The configuration of the engine 10 will be described in detail later.

ECU 100 causes the hybrid electric vehicles to travel in either the motor mode or the hybrid mode. In the motor mode, ECU 100 releases K0 clutch 14 and the hybrid electric vehicle is driven by the power of the motor generator 15. At this time, the engine 10 may be in a stopped state. In the hybrid mode, ECU 100 switches K0 clutch 14 into engagement, and the hybrid electric vehicle is driven by at least the power of the engine 10. When the engine 10 is switched from the stopped state to the hybrid mode, the engine 10 is started. At this time, the start-up control is executed. The driving mode is switched based on the required driving force of the vehicle obtained from the vehicle speed and the accelerator operation amount, the state of charge of the battery 16, and the like. When the battery 16 is charged by operating the engine 10, the engine 10 is also started when the engine 10 is in a stopped state.

Outline of the Engine

Figure 2:
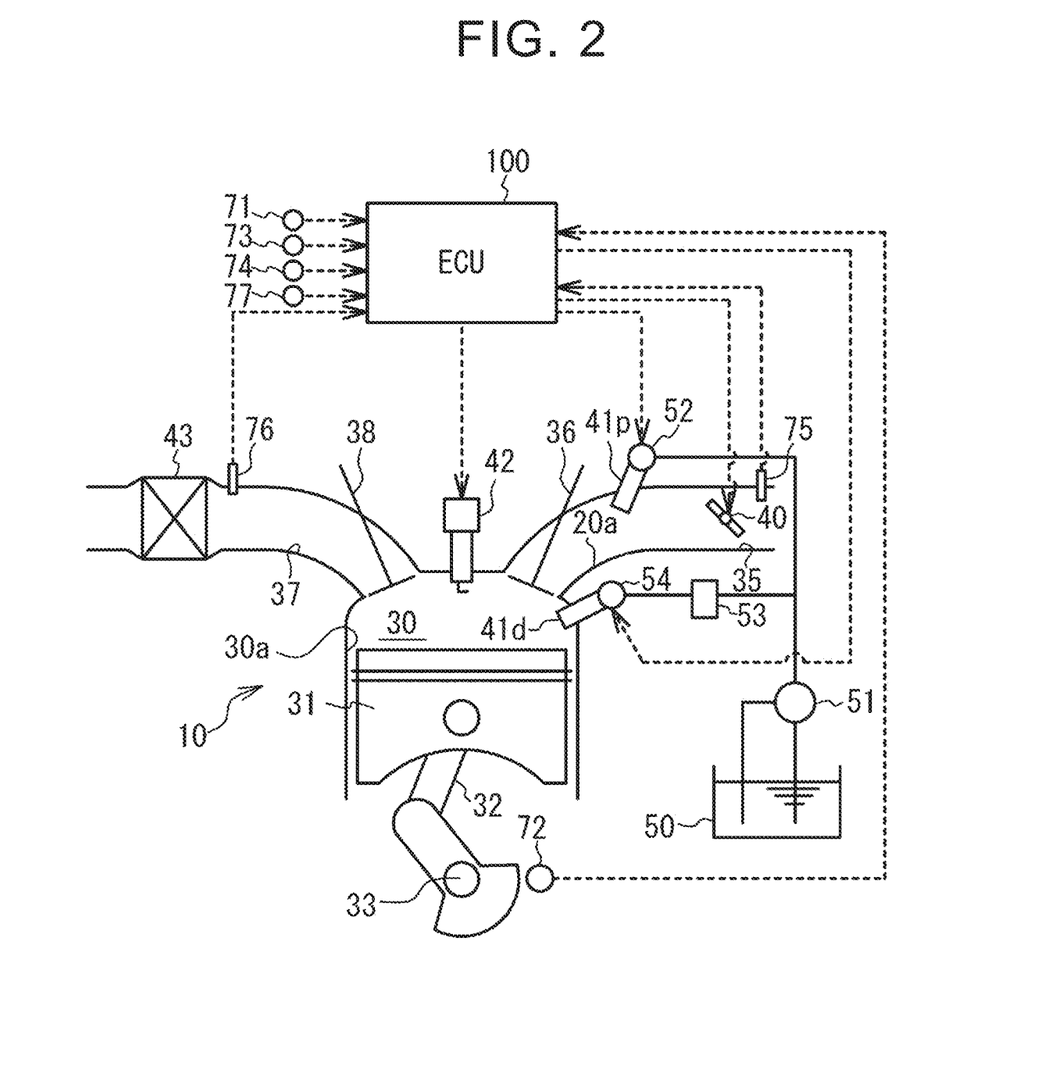
FIG. 2 is a schematic diagram of an engine.

FIG. 2 is a schematic configuration diagram of the engine 10. The engine 10 includes a cylinder 30, a piston 31, a connecting rod 32, a crankshaft 33, an intake passage 35, an intake valve 36, an exhaust passage 37, and an exhaust valve 38. In FIG. 2, only one of the plurality of cylinders 30 of the engine 10 is displayed. In the cylinder 30, combustion of the air-fuel mixture is performed. The piston 31 is reciprocally accommodated in each cylinder 30, and is connected to a crankshaft 33, which is an output shaft of the engine 10, via a connecting rod 32. The connecting rod 32 converts the reciprocating motion of the piston 31 into a rotational motion of the crankshaft 33. The piston 31 reciprocates along the axial direction of the cylinder 30 so as to be in sliding contact with the inner peripheral wall 30a of the cylinder bore of the cylinder 30.

The intake passage 35 is connected to an intake port of each cylinder 30 via an intake valve 36. The exhaust passage 37 is connected to an exhaust port of each cylinder 30 via an exhaust valve 38. The intake passage 35 is provided with an air flow meter 75 and a throttle valve 40 for adjusting an amount of intake air. An air-fuel ratio sensor 76 and a catalyst 43 for exhaust gas purification are provided in the exhaust passage 37.

The cylinder 30 is provided with a direct injection injector 41d. The direct injection injector 41d injects fuel directly into the cylinder 30. The intake passage 35 is provided with a port injector 41p for injecting fuel toward the intake port. The respective cylinders 30 are provided with spark plugs 42 that ignite an air-fuel mixture of the intake air introduced through the intake passage 35, the direct injection injector 41d, and the fuel injected by the port injector 41p by spark discharging.

The port injector 41p is connected to a low pressure delivery pipe 52. The fuel in the fuel tank 50 pumped up by the low-pressure pump 51 is supplied to the low-pressure delivery pipe 52. Since the low-pressure delivery pipe 52 is maintained at a relatively low fuel pressure, the port injector 41p injects fuel at a relatively low injection rate. The low-pressure pump 51 is an electric pump driven by supply of electric power.

The direct injection injector 41d is connected to the high-pressure delivery pipe 54. The high-pressure delivery pipe 54 is pumped up from the fuel tank 50 by the low-pressure pump 51, and the high-pressure pump 53 supplies the fuel that has been boosted to a high fuel pressure. Since the inside of the high-pressure delivery pipe 54 is maintained at a relatively high fuel pressure, the direct injection injector 41d injects fuel at a relatively high injection rate. The high-pressure pump 53 is a mechanical pump that is driven in conjunction with the rotation of the engine 10.

Stopping and Starting the Engine

ECU 100 automatically stops the engine 10 when a predetermined stop condition is satisfied in the hybrid mode or the engine mode, and executes intermittent operation control for automatically restarting the engine 10 when a predetermined automatic restart condition is satisfied. The automatic stop condition is, for example, when the accelerator operation amount becomes 0 in the hybrid mode or the engine mode. The automatic restart condition is, for example, a case where the accelerator operation amount becomes larger than 0 and the required torque to the engine 10 becomes larger than 0 after the automatic stop of the engine 10.

The engine 10 is required to start when the automatic restart condition is satisfied during the intermittent operation. When the engine 10 is requested to be started, ECU 100 controls K0 clutch 14 to be slipped, starts cranking of the engine 10 by the motor generator 15, and executes start-up control for starting combustion in the engine 10.

When the engine 10 is in the stopped state, K0 clutch 14 is in the released state, but ECU 100 executes control to engage K0 clutch 14 in accordance with the start command of the engine 10.

Start-Up Control

Hereinafter, the start-up control, although described with reference to FIGS. 3 and 4, for ease of understanding the description, prior to the description of the specific contents of the control along the flowchart shown in FIG. 3, will be described the schematic configuration of the start-up control.

The start-up control includes a start-up pre-stage control and a start-up post-stage control that is switched from the start-up pre-stage control. The start-up control includes selection of a fuel injection form (selection of an injector to be used for fuel injection), setting of an opening degree of the throttle valve 40, and setting of an ignition timing of the spark plug 42.

In the pre-start stage control, a first fuel injection mode using a direct injection injector 41d is employed. That is, a fuel-injection configuration in which only a direct injection injector 41d is used is employed. On the other hand, in the post-startup control, the second fuel injection mode using the port injector 41p is adopted. The second fuel injection mode may be a fuel injection mode in which only the port injector 41p is used, or may be a fuel injection mode in which the port injector 41p and the direct injection injector 41d are used in combination. However, when the port injector 41p and the direct injection injector 41d are used in combination, the fuel injection amount of the direct injection injector 41d is smaller than the fuel injection amount of the direct injection injector 41d when the first fuel injection mode is adopted. As described above, the fuel injection mode in the start-up control is different between the start-up pre-stage control and the start-up post-stage control.

On the other hand, the setting of the opening degree of the throttle valve 40 and the setting of the ignition timing of the spark plug 42 are maintained during the entire period in which the start-up control is executed. Specifically, the opening degree of the throttle valve 40 is set to the start-up throttle opening degree, and the ignition timing is set to the start-up time ignition timing. Here, the opening degree and the ignition timing of the throttle valve 40 for starting are set in advance by simulation or experimental adaptation of the actual device. In the present embodiment, the opening degree of the throttle valve 40 for starting is constant, and the starting time ignition timing is set so as to ignite in an expansion stroke which is on the retard side of the normal. However, these are examples of the setting in the start-up control and are not limited thereto, and may be changed as appropriate. After it is determined that the start of the engine 10 is completed, the opening degree and the ignition timing of the throttle valve 40 are shifted to the normal control which is changed based on the amount of depression of the accelerator and the required torque.

Hereinafter, a specific example of the start-up control will be described with reference to the flowchart shown in FIG. 3 and the time chart shown in FIG. 4.

In the following explanation, a situation will be described in which the hybrid electric vehicle 1 (see FIG. 1) starts the engine 10 from a state in which the motor generator 15 is running at a predetermined speed as a driving source. Therefore, as shown in FIG. 4, the motor generator 15 is assumed to be operating while maintaining a substantially constant motor rotational speed (hereinafter, referred to as MG rotational speed) corresponding to the traveling speed of the hybrid electric vehicle 1. The engine 10 is stopped before the time t1 in FIG. 4, and the engine speed before the time t1 is 0. When the starting condition of the engine 10 is satisfied at the time t1, ECU 100 makes an affirmative determination (Yes determination) at step S1 in FIG. 3, and proceeds to step S2. The case where the start condition of the engine 10 is satisfied is, for example, a case where the accelerator opening degree becomes larger than 0 and the required torque to the engine 10 becomes larger than 0 on the basis of the detection value of the accelerator operation amount sensor 74 (see FIG. 1). ECU 100 repeats the process of step S1 until an affirmative determination is made at step S1 when a negative determination is made at step S1 (No determination).

In S2 of steps, ECU 100 initiates a start-up control for starting the engine 10. ECU 100 starts to raise K0 clutch engagement hydraulic pressure in order to engage K0 clutch 14 from the time t1 when the start-up control is started. As a result, the driving torque of the motor generator 15 is transmitted to the engine 10, and the engine speed starts to increase so as to approach MG speed.

In ECU 100 where the start-up control is started, the start-up pre-stage control included in the start-up control is executed in the step S3 that is executed following the step S2. Specifically, the fuel injection according to the first fuel injection mode using the direct injection injector 41d is performed, the opening degree of the throttle valve 40 is set to the start throttle opening degree, and the ignition timing of the spark plug 42 is set to the start time ignition timing. Then, ECU 100 starts counting the number of times of fuel injection and the number of times of ignition of the spark plug 42 from the time point at which the start-up control is started, that is, from the time point at which the start-up pre-stage control is started. The number of fuel injections and the number of ignitions are used to evaluate the number of combustion cycles of the engine 10.

Figure 4:
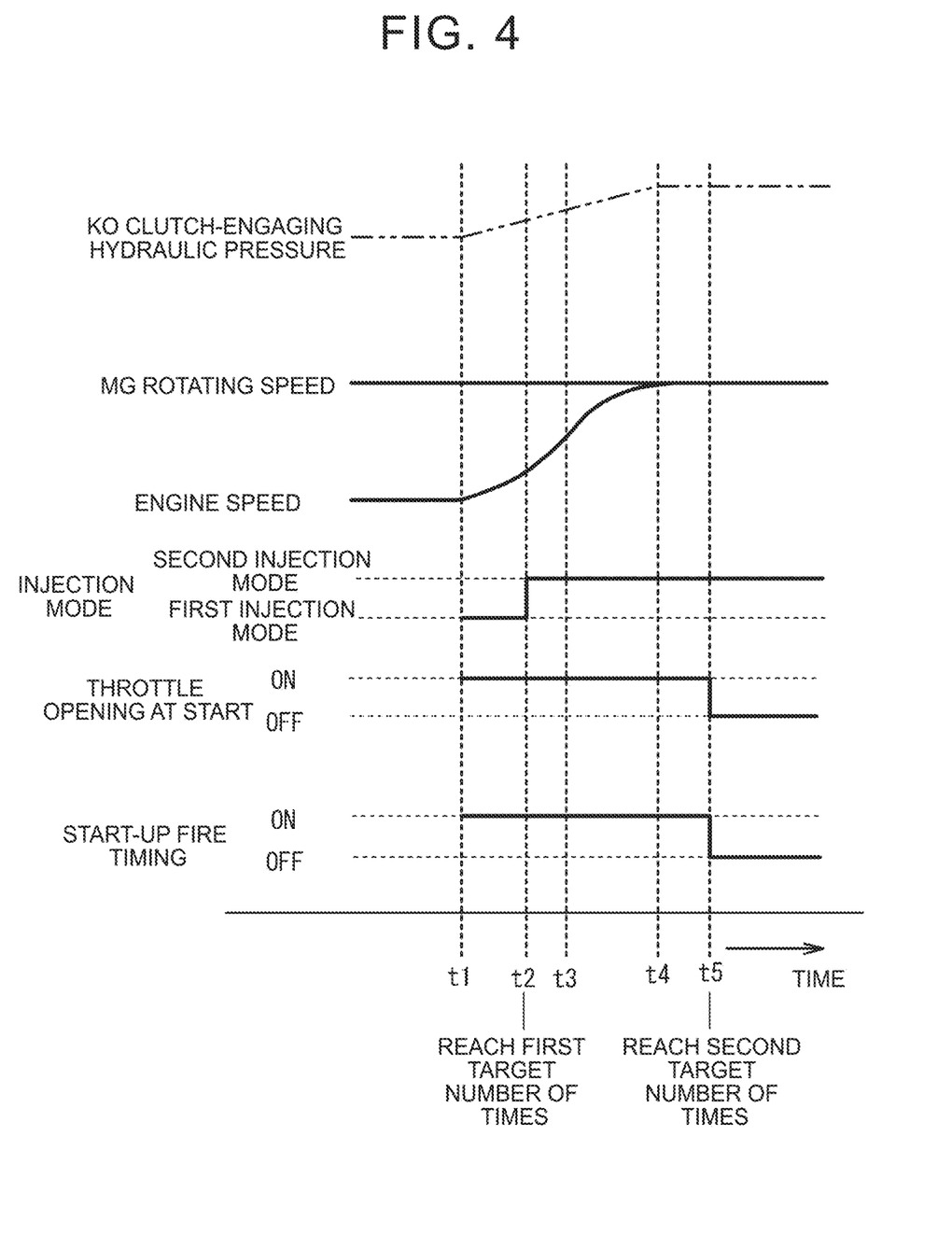
FIG. 4 is a time chart showing an example of the transition of each value when the start-up control by the control device of the embodiment is performed.

In the time chart shown in FIG. 4, ON of the throttle opening degree at the time of starting indicates that the throttle valve 40 is set to the throttle opening degree at the time of starting. In addition, OFF indicates that the setting of the start-up throttle opening degree is released, that is, the normal throttle control is performed in accordance with the accelerator operation amount. Similarly, ON of the starting time ignition timing indicates that the ignition timing of the spark plug 42 is set to the starting time ignition timing. Further, OFF indicates that the setting of the ignition timing at the time of starting is released, that is, the normal ignition timing control other than the time of starting is performed.

The injection of the fuel in the first fuel injection mode is executed by the direct injection injector 41d for a predetermined first target number of times of compression stroke injection. For this reason, ECU 100 determines whether or not the number of injections started to be counted from the time t1 has reached the first target number in the step S4. The first target number of times is set in advance by simulating or experimentally adapting the actual machine considering the adhesion of the fuel to the inner peripheral wall 30a of the cylinder bore of the cylinder 30 by the fuel injection by the direct injection injector 41d. When the fuel injection is performed by the direct injection injector 41d, there is a possibility that the fuel adheres to the inner peripheral wall 30a of the cylinder bore of the cylinder 30 and becomes a so-called wet bore condition. When the condition of the wet bore occurs, the particulate number (PN) in the exhaust gases is increased. Therefore, in the present embodiment, as the first target number of times, the number of times that both the avoidance of the wet bore state and the start of the engine 10 can be achieved is set. Further, the fact that the number of injections reaches the first target number of times is a condition for switching from the first injection mode to the second injection mode as will be described in detail later. Therefore, when setting the first target number of times, it is considered whether or not the air amount is in a state of being able to be calculated with a desired accuracy. When the engine 10 starts to rotate by the motor generator 15, the air in the intake passage 35 of the engine 10 starts to move, and the amount of air sucked into the cylinder 30 by the air flow meter 75 starts to be calculated. When the air amount can be calculated, injection control corresponding to the air amount is enabled. Therefore, the air amount can be calculated with a desired accuracy, and the first target number is set by evaluating whether or not it is possible to shift to the injection control according to the load, thereby achieving both avoidance of the bore wet state and start-up of the engine 10.

ECU 100, in step S4, when an affirmative determination is made, proceeds to step S5, on the other hand, when a negative determination is made in step S4, repeats the process of step S3, and continues the start time pre-stage control.

Note that the injection of the fuel in the first fuel injection mode may include the injection of the predetermined number of intake stroke injections after the injection of the predetermined number of compression stroke injections. The compression stroke injection is a fuel injection that is executed during the compression stroke with respect to the cylinder 30, which in turn becomes the compression stroke with the start of cranking. By performing the compression stroke injection, the torque of the engine 10 can be increased early. The intake stroke injection is a fuel injection that is executed during the intake stroke with respect to the cylinder 30 that is in turn an intake stroke. By executing the intake stroke injection, the torque of the engine 10 can be stabilized.

ECU 100 switches from the start-up pre-stage control to the start-up post-stage control in the stepwise S5. Specifically, switching from the first fuel injection mode to the second fuel injection mode is performed. In the time chart illustrated in FIG. 4, since the number of injections has reached the first target number of times at the time t2, the injection form is switched from the first injection form to the second injection form at the time t2. In the second injection mode, the fuel injection by the port injector 41p is executed, and accordingly, the fuel injection by the direct injection injector 41d is stopped. As a result, it is possible to prevent the inner peripheral wall 30a of the cylinder bore from becoming wet. As described above, in the second injection mode, the port injector 41p and the direct injection injector 41d may be used in combination. In this case, by setting the fuel injection amount of the direct injection injector 41d to be smaller than the fuel injection amount of the direct injection injector 41d in the first fuel injection mode, it is possible to prevent the fuel from adhering to the inner peripheral wall 30a of the cylinder bore.

In the step S6 executed subsequent to the step S5, ECU 100 determines whether or not the number of injections that have started counting from the time t1 has reached the second target number. The step S6 determines whether or not the termination condition of the start-up control is satisfied. The second target number is a number larger than the first target number. The second target number is set in advance by simulation or experimental adaptation of the actual machine as the number of times the engine 10 can be started by the cranking torque of the motor generator 15. In the time chart illustrated in FIG. 4, the engine speed and MG speed coincide with each other in the time t4 and are synchronized with each other. Further, the number of injections reaches the second target number in the time t5 after the time t4. The second target number of times in the present embodiment is set such that the time at which the number of injections reaches the second target number of times is later than the timing at which the engine speed coincides with MG speed. In the present embodiment, the first target rotational speed is set to 8 times and the second target number is set to 24 times, but these are examples and are appropriately set according to the specifications of the hybrid electric vehicle 1.

ECU 100 considers that the operation status of the engine 10 is stable when the number of injections reaches the second target number, and assumes that the start of the engine 10 is completed. When an affirmative determination is made in step S6, ECU 100 proceeds to step S7. On the other hand, when a negative determination is made in step S6, ECU 100 repeats the process of step S5 and continues the post-start control.

ECU 100 terminates the start-up control in S7 of steps. Then, the injection mode, the throttle opening degree, and the ignition timing are switched to the control after the start determination of the engine 10. That is, ECU 100 shifts to the control of the injection mode, the throttle opening degree, and the ignition timing for outputting the required torque calculated based on the detected values of the accelerator operation amount sensor 74, the air flow meter 75, the air-fuel ratio sensor 76, the water temperature sensor 77, and the like. In the time chart illustrated in FIG. 4, the start-up throttle opening degree is set to OFF at the time t5, and the start-up time ignition timing is set to OFF. After S7 of steps, the series of control ends.

Effects

As described above, in the present embodiment, when the number of injections reaches the first target number of times, the first fuel injection mode using only the direct injection injector 41d is switched to the second fuel injection mode using the port injector prior to the completion of the start-up control, so that the adhesion of the fuel to the inner peripheral wall of the cylinder bore is suppressed.

In the above embodiment, the number of combustion cycles is evaluated by the number of injections of the direct injection injector 41d, but the number of combustion cycles may be evaluated by the number of ignitions by the spark plug 42. Further, the number of combustion cycles may be evaluated based on the number of revolutions of the crankshaft.

Modification

Figure 5:
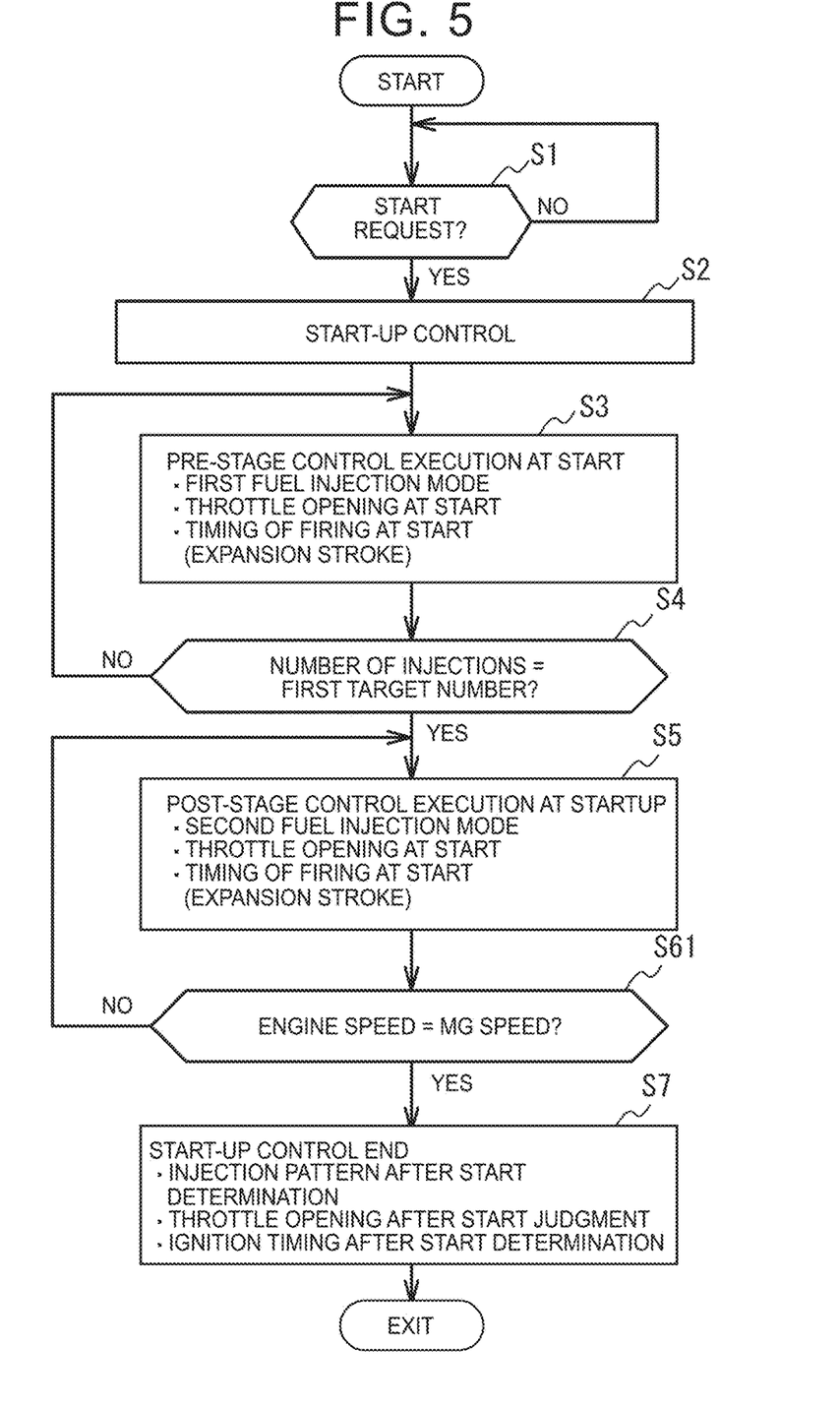
FIG. 5 is a flowchart illustrating an example of start-up control in a hybrid electric vehicle executed by a control device according to a modification of the embodiment.

Next, a modification will be described with reference to FIGS. 5 and 6. In the flowchart illustrated in FIG. 5, the step S6 in the flowchart illustrated in FIG. 3 is replaced with a step S61.

Figure 3:
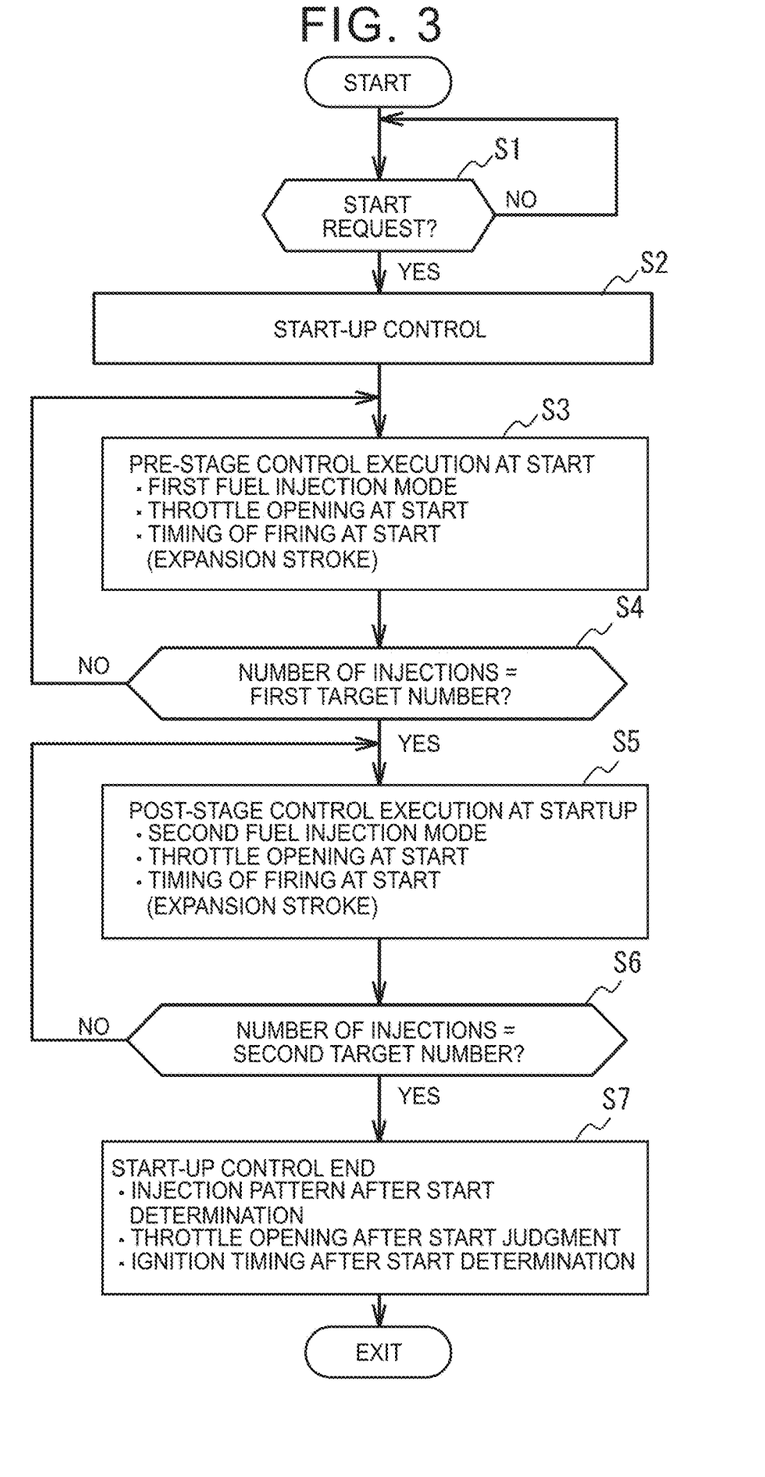
FIG. 3 is a flowchart illustrating an example of start-up control in the hybrid electric vehicle executed by the control device according to the embodiment.

The step S6 in FIG. 3 determines whether or not the number of injections has reached the second target number as a determination as to whether or not the termination condition of the start-up control has been satisfied. On the other hand, in the step S61, it is determined whether or not the engine speed matches MG speed, for example, whether or not both the rotation speeds become 1000 rpm. That is, in this modification, the state in which the engine speed and MG speed coincide with each other is determined as the termination condition of the start-up control. The engine speed is calculated from the detection value of the crank angle sensor 72, and MG speed is acquired as the detection value of the motor rotational speed sensor 73.

When an affirmative determination is made in step S61, ECU 100 proceeds to step S7. On the other hand, when a negative determination is made in step S61, ECU 100 repeats the process of step S5 and continues the post-start control.

Figure 6:
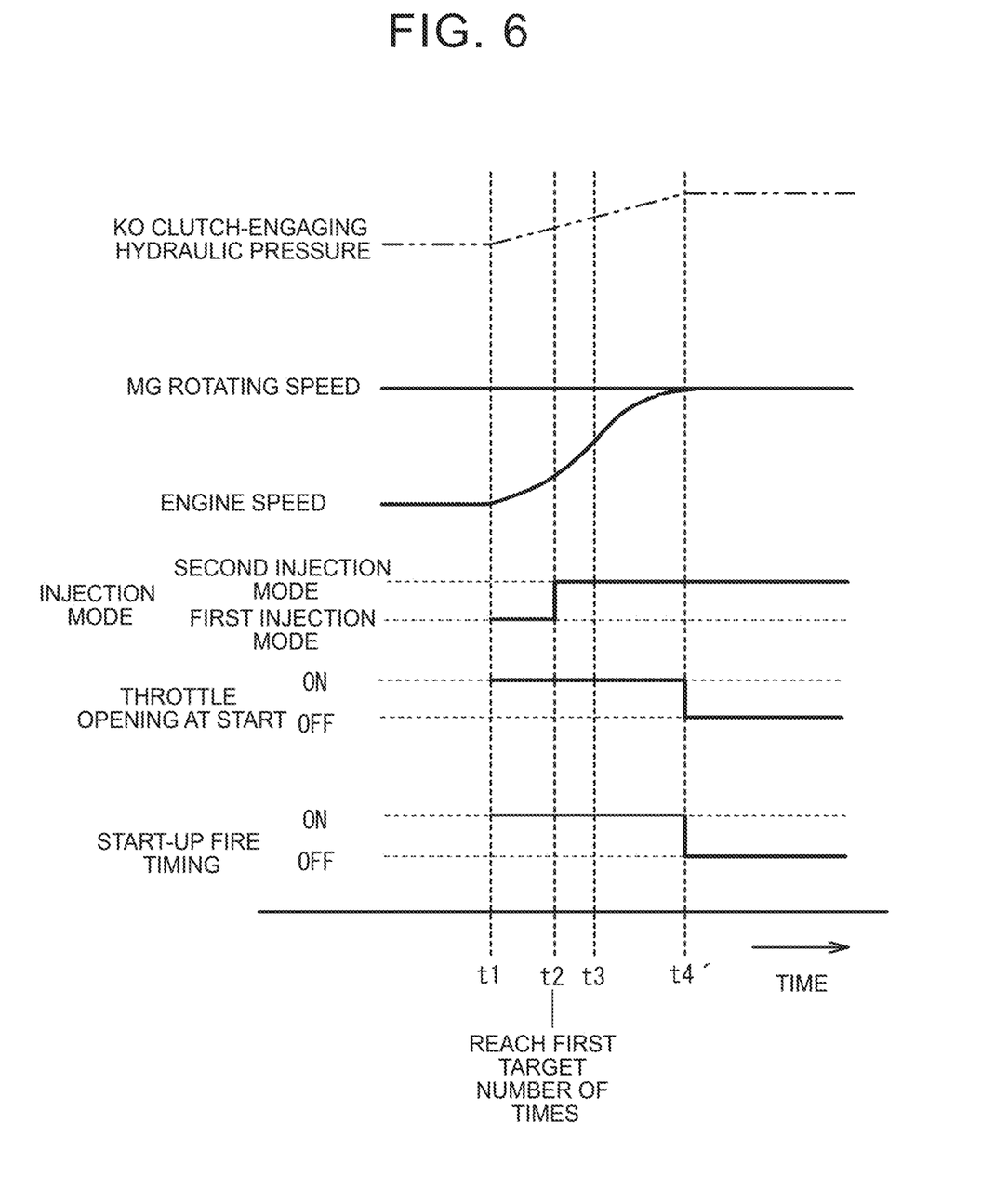
FIG. 6 is a time chart showing an example of transition of each value when start-up control is performed by the control device according to a modification of the embodiment.

Referring to FIG. 6, in this modification, the start-up throttle opening is set to OFF at a time point t4' at which the engine rotation coincides with MG rotation speed, and the start-up ignition timing is set to OFF. After S7 of steps, the series of control ends.

Since the contents of the other control do not differ from the flowchart shown in FIG. 3, the description of the common steps will be omitted here.

Also in such a modification, since the first fuel injection mode using only the direct injection injector 41*d* is switched to the second fuel injection mode using the port injector prior to the completion of the start-up control, the adhesion of the fuel to the inner peripheral wall of the cylinder bore is suppressed.

In the above embodiment, the hybrid electric vehicle is controlled by a single ECU 100, but the present disclosure is not limited thereto. For example, the above-described control may be executed by a plurality of ECU such as an engine ECU for controlling the engine 10 and a clutch ECU for controlling the motor ECU, K0 clutch 14 for controlling the motor generator 15.

Although the embodiments of the present disclosure have been described in detail above, the present disclosure is not limited to such specific embodiments, and various modifications and changes can be made within the scope of the gist of the present disclosure described in the claims.

What is claimed is:

1. A control device for a hybrid electric vehicle, the hybrid electric vehicle including an internal combustion engine including a direct injection injector and a port injector, an electric motor connected to a power transmission path between the internal combustion engine and a drive wheel such that the electric motor is able to transmit power, and a connection and disconnection clutch that is provided in the power transmission path and that disconnects connection between the internal combustion engine and the electric motor when being switched to a released state, the control device for the hybrid electric vehicle comprising an electronic control unit, wherein:

the electronic control unit is configured to rotate the internal combustion engine with driving torque of the electric motor by shifting the connection and disconnection clutch to an engaged state when the internal combustion engine is started, and to execute start-up control for starting a first fuel injection mode for using the direct injection injector; and the electronic control unit is configured to switch from the first fuel injection mode to a second fuel injection mode for using the port injector prior to an end of the start-up control when the number of times of combustion cycles of the internal combustion engine with the first fuel injection mode reaches a predetermined first target number of times.

2. The control device for the hybrid electric vehicle according to claim 1, wherein the electronic control unit is configured to terminate the start-up control when the number of times of the combustion cycles of the internal combustion engine reaches a predetermined second target number of times, the second target number of times being larger than the first target number of times.

3. The control device for the hybrid electric vehicle according to claim 1, wherein the electronic control unit is configured to terminate the start-up control when determination is made that a speed of the internal combustion engine and a rotational speed of the electric motor are synchronized with each other.

4. The control device for the hybrid electric vehicle according to claim 1, wherein the number of times of the combustion cycles of the internal combustion engine is the number of times of injection of the direct injection injector.

5. The control device for the hybrid electric vehicle according to claim 1, wherein the number of times of the combustion cycles of the internal combustion engine is the number of times of ignition by a spark plug provided in the internal combustion engine.

* * * * *